United States Patent
Baird

(10) Patent No.: US 7,134,322 B1
(45) Date of Patent: Nov. 14, 2006

(54) LOCATING ONE OR MORE LEAKS IN A POWER GENERATING SYSTEM WHILE THE POWER GENERATING SYSTEM IS ONLINE

(75) Inventor: Mark A. Baird, Kaufman, TX (US)

(73) Assignee: Equipment Imaging and Solutions, Inc., Kaufman, TX (US)

( * ) Notice: Subject to any disclaimer, the term of this patent is extended or adjusted under 35 U.S.C. 154(b) by 168 days.

(21) Appl. No.: 10/933,106

(22) Filed: Sep. 2, 2004

(51) Int. Cl.
*G01M 3/20* (2006.01)

(52) U.S. Cl. .................. 73/40.7; 73/40.5 R; 73/46

(58) Field of Classification Search ............. 73/40.5 R, 73/46, 40.7
See application file for complete search history.

(56) References Cited

U.S. PATENT DOCUMENTS

| | | | | |
|---|---|---|---|---|
| 1,934,948 | A * | 11/1933 | Perrine ........................ | 73/197 |
| 4,489,239 | A * | 12/1984 | Grant et al. ........... | 250/339.03 |
| 4,555,627 | A | 11/1985 | McRae, Jr. .................. | 250/334 |
| 4,846,410 | A * | 7/1989 | Jewett et al. ................. | 241/31 |
| 4,918,975 | A * | 4/1990 | Voss ........................... | 73/40.7 |
| 5,492,004 | A * | 2/1996 | Berg et al. .................... | 73/40.7 |
| 5,650,563 | A * | 7/1997 | Cooper et al. ............... | 73/40.7 |
| 5,834,632 | A * | 11/1998 | Olender et al. .............. | 73/40.7 |
| 5,942,678 | A * | 8/1999 | Wettstein .................... | 73/40.7 |
| 6,170,319 | B1 * | 1/2001 | Chen et al. .................. | 73/40.7 |
| 6,170,320 | B1 * | 1/2001 | Scaringe et al. ............. | 73/40.7 |
| 6,966,213 | B1 * | 11/2005 | Hoots et al. ................. | 73/40.7 |

OTHER PUBLICATIONS

Tondi, D.M.; Coil, R. "Experience with the use of SF6 to locate condeser leakage in power plants," Sep. 1987, Providence RI, Condenser technology symposium: Proceedings, Abstract.*
"Leak Testing System Proves Effective on Generators," Power Engineering, Mar. 2003, p. 14.
"Generator Leak Testing Using SF6 Tracer Gas," Jan. 20, 2003, Presentation to TXU Energy, 59 pages.

* cited by examiner

*Primary Examiner*—Hezron Williams
*Assistant Examiner*—John Fitzgerald
(74) *Attorney, Agent, or Firm*—Baker Botts L.L.P.

(57) ABSTRACT

In one embodiment, a method for locating one or more leaks in a power generating system while the power generating system is online includes adding a detectable gas to a cooling system of a power generating system while the power generating system is online. The detectable gas is capable of absorbing light having one or more particular properties. The method also includes directing light having the one or more particular properties at a section of the power generating system and viewing the section of the power generating system to determine whether detectable gas emanating from the section of the power generating system is absorbing light directed at the section of the power generating system. Detectable gas emanating from the section of the power generating system would indicate a leak in the power generating system.

4 Claims, 2 Drawing Sheets

US 7,134,322 B1

LOCATING ONE OR MORE LEAKS IN A POWER GENERATING SYSTEM WHILE THE POWER GENERATING SYSTEM IS ONLINE

TECHNICAL FIELD

This invention relates generally to maintenance of a power generating system and more particularly to locating one or more leaks in a power generating system while the power generating system is online.

BACKGROUND

In a typical power generating system, a cooling system circulates hydrogen gas through the power generating system to cool one or more components of the power generating system when in service. Leaks often occur at seals, joints, or other areas on components of the power generating system, and hydrogen gas in the cooling system often leaks out of the power generating system through such leaks. Because hydrogen gas is extremely flammable, such leaks are often hazardous. Such leaks also tend to increase costs associated with operating the power generating system. To maintain operating pressure inside the cooling system, an operator of the power generating system might need to replace the hydrogen gas leaking out of the cooling system. Costs associated with replacing the hydrogen gas leaking out of the cooling system tend to increase costs associated with operating the power generating system online.

To locate one or more leaks in a cooling system of a power generating system, an operator of the power generating system typically takes the power generating system offline, removes all hydrogen gas from the cooling system, and pumps a mixture of air and helium gas into the cooling system. The operator then uses a device for detecting helium gas to locate one or more general areas where helium gas is leaking from the cooling system and applies soapy water to the power generating system where the operator detected helium leaking from the cooling system. The operator then looks for gas bubbling out through the soapy water to attempt to pinpoint the leaks and, if the operator pinpoints the leaks, makes repairs to the power generating system to fix the leaks. To determine whether such repairs have adequately stopped leakage from the cooling system, the operator typically repeats the above process, which usually takes several days to complete. Because the power generating system is offline and not generating power sellable to customers, the operator often loses revenue during the above process.

SUMMARY OF THE INVENTION

The present invention may reduce or eliminate disadvantages and problems often associated with maintenance of power generating systems.

In one embodiment, a method for locating one or more leaks in a power generating system while the power generating system is online includes adding a detectable gas to a cooling system of a power generating system while the power generating system is online. The detectable gas is capable of absorbing light having one or more particular properties. The method also includes directing light having the one or more particular properties at a section of the power generating system and viewing the section of the power generating system to determine whether detectable gas emanating from the section of the power generating system is absorbing light directed at the section of the power generating system. Detectable gas emanating from the section of the power generating system would indicate a leak in the power generating system.

Particular embodiments of the present invention may provide one or more technical advantages. As an example, particular embodiments may facilitate location of one or more leaks in a power generating system while the power generating system is online. Particular embodiments may facilitate precise location of one or more leaks in a power generating system. Particular embodiments may facilitate determining a size of a leak in a power generating system. In particular embodiments, an operator may continue to operate a power generating system while locating one or more leaks in the power generating system, which may reduce revenue loss associated with located and repairing leaks in a power generating system. Particular embodiments of the present invention provide all, some, or none of these technical advantages. Particular embodiments may provide one or more other technical advantages, one or more of which may be readily apparent to a person skilled in the art from the figures, description, and claims herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
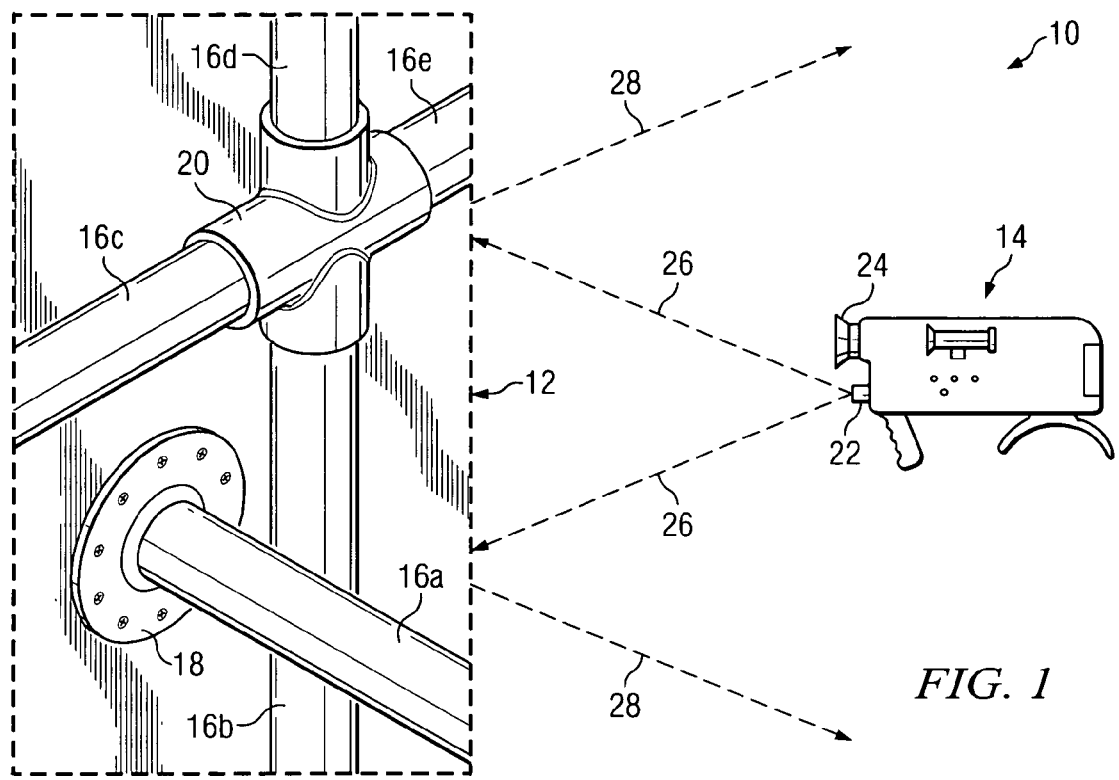
FIG. 1 illustrates an example system for locating leaks in a power generating system while the power generating system is online.

FIG. 1 illustrates an example system 10 for locating leaks in a power generating system while the power generating system is online. In particular embodiments, a power generating system is a power generator at a power plant. Example power generators include the steam turbine generator units at the Big Brown Steam Electric Station operated by TXU. Other example power generators include the steam turbine generator units at the Monticello Steam Electric Station operated by TXU. Other example power generators include gas turbine generator units. Although particular power generating systems are described, the present invention contemplates any suitable power generating systems. In particular embodiments, reference to a power generating system that is "online" encompasses a power generating system that is at least partially operating and generating at least some power.

In particular embodiments, a power generating system includes a cooling system that circulates hydrogen gas through the power generating system to cool one or more components of the power generating system when in service. Leaks may occur at seals, joints, or other areas on components of the power generating system, and hydrogen gas in the cooling system may leak out of the power generating system through such leaks. As an example and not by way of limitation, leaks may occur where instrumentation penetrates a shell of the power generating system. As yet another example, leaks may occur at hydrogen shaft seals in the power generating system. As yet another example, leaks may occur at hydrogen coolers in the power generating system. Although particular leaks in particular components of a particular power generating system are described, the present invention contemplates any suitable leaks in any suitable components of any suitable power generating system. Because hydrogen gas is extremely flammable, such leaks may be hazardous. Such leaks may also increase costs associated with operating the power generating system. To maintain operating pressure inside the cooling system, an operator of the power generating system may need to replace the hydrogen gas leaking out of the cooling system. Costs associated with replacing the hydrogen gas leaking out of the cooling system may increase costs associated with operating the power generating system. Although a particular cooling system circulating a particular gas through a particular power generating system is described, the present invention contemplates any suitable cooling system circulating any suitable gas through any suitable power generating system.

System 10 includes an example section 12 of a power generating system and a camera system 14. In particular embodiments, section 12 encompasses only a small section 12 of the power generating system. Section 12 includes segments 16 of pipes of the power generating system facilitating circulation of hydrogen gas through the power generating system. In section 12, a seal 18 couples an end of segment 16a to a component of the power generating system, and a joint 20 couples segments 16b, 16c, 16d, and 16e to each other. Although a particular section 12 including particular components of a particular power generating system is illustrated and described, the present invention contemplates any suitable section 12 including any suitable components of any suitable power generating system.

In particular embodiments, camera system 14 includes a laser component 22 and a camera component 24. Laser component 22 scatters laser light away from laser component 22 against a target, and the laser light reflects off the target back to camera component 24. In particular embodiments, camera component 24 is an infrared camera component 24. Camera component 24 generates an image of the target from the reflected laser light. In particular embodiments, because of a wavelength of the laser light, if laser light from camera system 14 passed through sulfur hexafluoride ($SF_6$) gas between the target and camera system 14, the $SF_6$ gas would absorb at least some of the laser light passing through the $SF_6$ gas. Only unabsorbed laser light would reflect back to camera component 24, and the $SF_6$ gas would be visible in the generated image of the target. As an example and not by way of limitation, in particular embodiments, the generated image would include one or more opaque, translucent, or other dark areas (instead of an image of the target behind the $SF_6$ gas) where laser light passed through the SF6 gas. In particular embodiments, camera system 14 is tunable across a range of wavelengths of laser light. Although a particular camera system 14 including a particular laser component 22 and a particular camera component 24 is illustrated and described, the present invention contemplates any suitable camera system 14 including any suitable laser component 22 and any suitable camera component 24. Although a particular image generated from particular laser light is described, the present invention contemplates any suitable image generated from any suitable laser light. Although a particular gas absorbing particular laser light is described, the present invention contemplates any suitable gas absorbing any particular laser light.

Loss of pressure inside the cooling system of the power generating system may prompt an operator of the power generating system to locate and fix one or more leaks in the power generating system. As an example and not by way of limitation, if pressure inside the cooling system drops below a particular threshold, the loss of pressure may prompt the operator to locate and fix one or more leaks in the power generating system. An amount of hydrogen gas pumped into the cooling system just to maintain operating pressure inside the cooling system may also prompt the operator to locate and fix one or more leaks in the power generating system. As an example and not by way of limitation, if an amount of hydrogen gas pumped into the cooling system just to maintain operating pressure inside the cooling system reaches a particular threshold, the amount of hydrogen gas pumped into the cooling system just to maintain operating pressure inside the cooling system may prompt the operator to locate and fix one or more leaks in the power generating system. Although particular events prompting an operator of a particular power generating system to locate and fix particular leaks in a particular cooling system are described, the present invention contemplates any suitable events prompting an operator of any suitable power generating system to locate and fix any suitable leaks in any suitable cooling system.

In particular embodiments, to locate one or more leaks in the cooling system, the operator pumps sulfur hexafluoride ($SF_6$) gas into the cooling system while the power generating system is online, i.e., without taking the power generating system offline. The $SF_6$ gas then leaks out of the cooling system through one or more leaks leaking hydrogen gas, which enables location of the leaks, as described below. In particular embodiments, to pump $SF_6$ gas into the cooling system, the operator couples a source of $SF_6$ gas (such as a pressurized tank of $SF_6$ gas) to the cooling system through a regulator. The operator then sets the regulator to a pressure approximately ten pounds per square inch (PSI) above an operating pressure inside the cooling system and allows $SF_6$ gas to flow from the source of $SF_6$ gas into the cooling system. As an example and not by way of limitation, to allow $SF_6$ gas to flow from the source of $SF_6$ gas into the cooling system, the operator may open a valve on the regulator.

In particular embodiments, when the operator pumps $SF_6$ gas into the cooling system, the operator monitors one or more conditions of the power generating system. As an example and not by way of limitation, when the operator pumps $SF_6$ into the cooling system, the operator may monitor purity of hydrogen gas inside the cooling system, pressure inside the cooling system, and pressure at a differential fan inside the cooling system to at least approximately maintain the purity of the hydrogen gas, the pressure inside the cooling system, and the pressure at the differential fan to original equipment manufacturer (OEM) specifications on the power generating system. In particular embodiments, the operator monitors such conditions of the power generating system to facilitate preventing the power generating system from becoming overpressured, which could damage one or more pressure-sensitive seals on the power generating system, cause one or more leaks in the power generating system, or otherwise damage the power generating system. Before pumping $SF_6$ gas into the cooling system, the operator may record the purity of hydrogen gas inside the cooling system, the pressure inside the cooling system, and the pressure at the differential fan inside the cooling system. While pumping $SF_6$ gas into the cooling system, the operator may monitor the purity of hydrogen gas inside the cooling system, the pressure inside the cooling system, and pressure at the differential fan inside the cooling system to at least approximately maintain the purity of the hydrogen gas, the pressure inside the cooling system, and the pressure at the differential fan according to OEM specifications on the power generating system. After pumping $SF_6$ gas into the cooling system, the operator may again record the purity of hydrogen gas inside the cooling system, pressure inside the cooling system, and pressure at the differential fan inside the cooling system. Although particular monitoring of particular conditions of a particular power generating system are described, the present invention contemplates any suitable monitoring of any suitable conditions of any suitable power generating system.

In particular embodiments, an operator pumps an amount of $SF_6$ gas into the cooling system resulting in a gas mixture inside the cooling system including approximately 5% $SF_6$ gas by volume. To pump an amount of $SF_6$ gas into the cooling system resulting in a gas mixture inside the cooling system including approximately 5% $SF_6$ gas by volume, an operator may pump an amount of $SF_6$ gas measured by weight into the cooling system displacing approximately 5% of gas inside the cooling system. As an example and not by way of limitation, approximately one pound of $SF_6$ gas may displace approximately two and one-half cubic feet inside the cooling system at approximately twenty-one degrees Celsius. If the cooling system holds approximately 1000 cubic feet of gas, an operator may pump approximately twenty pounds of $SF_6$ gas into the cooling system to displace approximately fifty cubic feet (which is approximately 5% of 1000 cubic feet) inside the cooling system, which may result in a gas mixture inside the cooling system including approximately 5% $SF_6$ gas by volume. Although pumping a particular amount of a particular gas into a particular cooling system to locate particular leaks in the cooling system is described, the present invention contemplates pumping any suitable amount of any suitable gas in any suitable cooling system to locate any suitable leaks in the cooling system.

In particular embodiments, when the operator has pumped an amount of $SF_6$ gas into the cooling system resulting in a gas mixture inside the cooling system including approximately 5% $SF_6$ gas by volume, the operator scans sections 12 of the power generating system using camera system 14 to find leaks in the cooling system. When the operator finds a leak, the operator may mark the leak for repair. While the operator scans sections 12 of the power generating system, the operator may carry and monitor a combustible gas analyzer. The combustible gas analyzer enables the operator to determine whether unsafe conditions are developing around the power generating system as a result of a buildup of hydrogen gas leaking from the cooling system. A buildup of hydrogen gas leaking from the cooling system could possibly lead to an explosion. To scan a section 12 of the power generating system, the operator directs laser component 22 of camera section 14 at section 12. Laser component 22 scatters laser light 26 against section 12, and laser light 28 reflects off section 12 back to camera component 24 of camera system 14. Camera component 24 then generates an image of section 12 from laser light 28. If section 12 included a leak leaking hydrogen gas, $SF_6$ gas pumped into the cooling system would leak out of the cooling system through the leak. The $SF_6$ gas would absorb at least some laser light 26, at least some laser light 28, or both, and only unabsorbed laser light 28 would reach camera component 24. Because only unabsorbed laser light 28 would reach camera component 24, the $SF_6$ gas leaking from the cooling system would cause an effluent, dark cloud emanating from the leak to appear in the generated image. The effluent, dark cloud would likely indicate a precise location of the leak, a size of the leak, or both. In particular embodiments, a site on the power generating system in the generated image emanating the effluent, dark cloud would likely indicate a precise location of the leak. In particular embodiments, one or more visible dimensions of the effluent, dark cloud in the generated image, a visible flow rate of the effluent, dark cloud in the generated image, or both would likely indicate a size of the leak.

Figure 2:
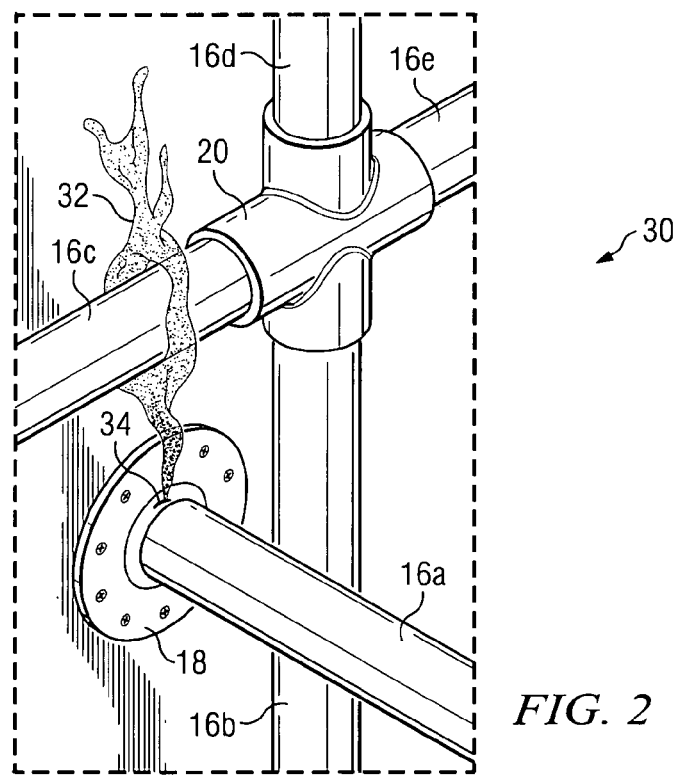
FIG. 2 illustrates an example image generated by a camera system from laser light reflected off a section of a power generating system.

FIG. 2 illustrates an example image 30 generated by camera system 14 from laser light 28 reflected off section 12. Section 12 includes a leak at seal 18. Generated image 30 shows an effluent, dark cloud 32 of $SF_6$ gas emanating from a site 34 on seal 18. Cloud 32 is visible in generated image 30 because of $SF_6$ gas in cloud 32 absorbing at least some laser light 26, at least some laser light 28, or both, passing though cloud 32. Site 34 indicates a precise location of the leak at seal 18. One or more visible dimensions of cloud 32 in generated image 30, a visible flow rate of cloud 32 in generated image 30, or both indicate a size of the leak. Although a particular image 30 generated by a particular camera system 14 from particular laser light 28 reflected off a particular section 12 of a particular power generating system is illustrated and described, the present invention contemplates any suitable image 30 generated by any suitable camera system 14 from any suitable laser light 28 reflected off any suitable section 12 of any suitable power generating system. Although particular indicators in a particular generated image 30 providing particular indications regarding particular leaks in a particular power generating system are described, the present invention contemplates any suitable indicators in any suitable generated image 30 providing any suitable indications regarding any suitable leaks in any suitable power generating system.

Figure 3:
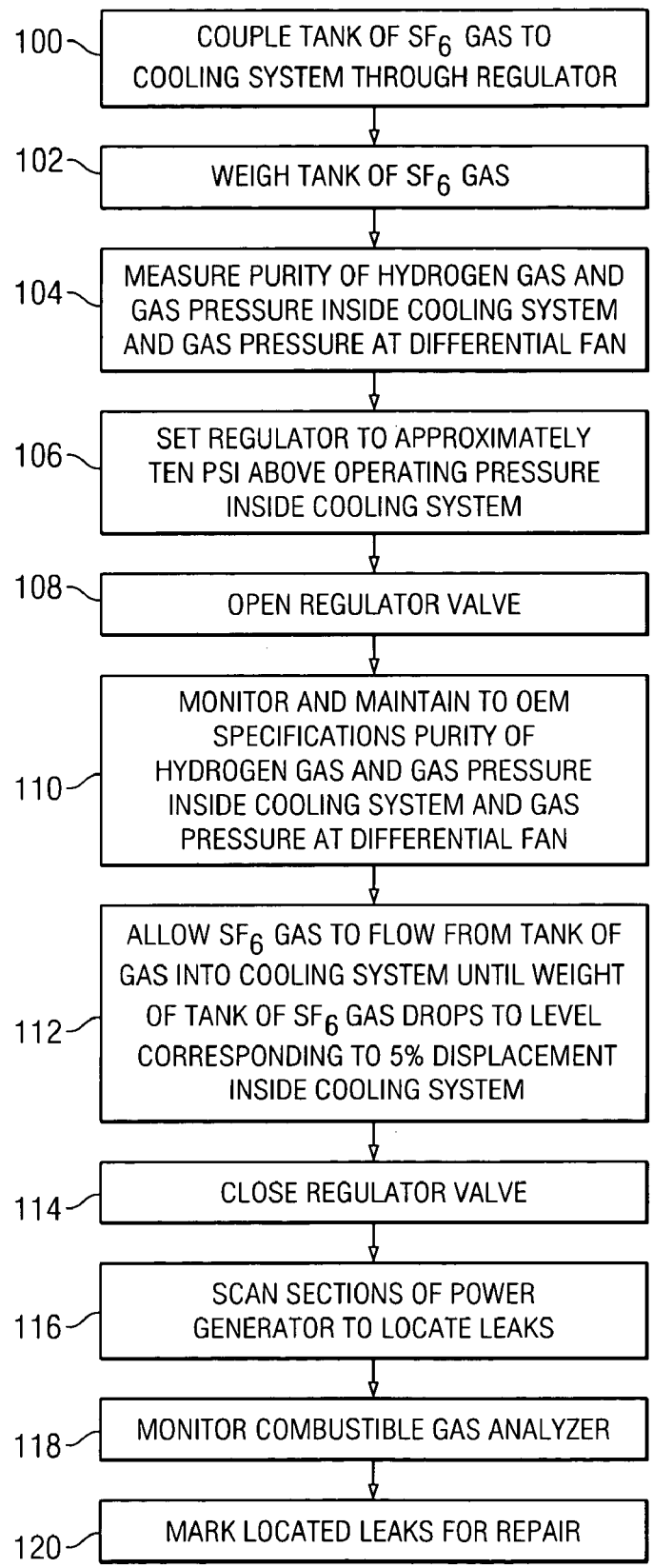
FIG. 3 illustrates an example method for locating leaks in a power generating system while the power generating system is online.

FIG. 3 illustrates an example method for locating leaks in a power generating system while the power generating system is online. The method begins at step 100, where an operator of the power generating system couples a pressurized tank of $SF_6$ gas to a cooling system of the power generating system through a regulator. At step 102, the operator weighs the pressurized tank of $SF_6$ gas. At step 104, the operator measures purity of hydrogen gas inside cooling system, gas pressure inside cooling system, and gas pressure at a differential fan inside the cooling system. At step 106, the operator sets the regulator to approximately ten PSI above an operating pressure inside the cooling system. At step 108, the operator opens a valve on the regulator to allow $SF_6$ gas to flow from the tank of $SF_6$ gas into the cooling system. At step 110, while $SF_6$ gas is flowing from the tank of $SF_6$ gas into the cooling system, the operator monitors and attempts to at least approximately maintain to OEM specifications the purity of hydrogen gas and the gas pressure inside cooling system and the gas pressure at the differential fan. At step 112, the operator allows $SF_6$ gas to flow from the tank of SF6 gas into the cooling system until a weight of the tank of $SF_6$ gas drops to an approximate level corresponding to a gas mixture inside the cooling system including approximately 5% $SF_6$ gas by volume inside the cooling system. At step 114, in response to the weight of the tank of $SF_6$ gas dropping to an approximate level corresponding to a gas mixture inside the cooling system including approximately 5% $SF_6$ gas by volume, the operator closes the valve on the regulator to stop $SF_6$ gas from flowing from the tank of $SF_6$ gas into the cooling system. At step 116, the operator scans sections 12 of the power generator using camera system 14 to locate leaks in the power generating system. At step 118, while the operator is scanning sections 12 of the power generating system, the operator monitors a combustible gas analyzer for combustible gas around the power generating system. At step 120, the operator marks any located leaks in the power generating system for repair, at which point the method ends. Although particular steps in the method illustrated in FIG. 3 are described and illustrated as occurring in a particular order, the present invention contemplates any suitable steps in the method illustrated in FIG. 3 occurring in any suitable order.

Although the present invention has been described with several embodiments, myriad changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for locating one or more leaks in a power generating system while the power generating system is online, the method comprising:
    adding an amount of a detectable gas to a cooling system of a power generating system while the power generating system is online, the detectable gas being capable of absorbing light having one or more particular properties, the amount of the detectable gas added to the cooling system resulting in a gas mixture inside the cooling system having a volume approximately 5% of which comprises the detectable gas;
    directing light comprising the one or more particular properties at a section of the power generating system; and
    viewing the section of the power generating system to determine whether detectable gas emanating from the section of the power generating system is absorbing light directed at the section of the power generating system, the detectable gas emanating from the section of the power generating system indicating a leak in the power generating system.

2. The method of claim 1, wherein adding the amount of the detectable gas to the cooling system resulting in a gas mixture inside the cooling system having a volume approximately 5% of which comprises the detectable gas comprises measuring a weight of the detectable gas being added to the cooling system.

3. A method for locating one or more leaks in a power generating system while the power generating system is online, the method comprising:
    adding a detectable gas to a cooling system of a power generating system while the power generating system is online, the detectable gas being capable of absorbing light having one or more particular properties;
    while adding the detectable gas to the cooling system, monitoring a purity of a gas inside the cooling system, a pressure inside the cooling system, and a pressure at a differential fan inside the cooling system to at least approximately maintain the purity of hydrogen gas inside the cooling system, the pressure inside the cooling system, and the pressure at the differential fan to original equipment manufacturer (OEM) specification on the power generating system;
    directing light comprising the one or more particular properties at a section of the power generating system; and
    viewing the section of the power generating system to determine whether detectable gas emanating from the section of the power generating system is absorbing light directed at the section of the power generating system, the detectable gas emanating from the section of the power generating system indicating a leak in the power generating system.

4. A method for locating one or more leaks in a power generating system while the power generating system is online, the method comprising:
    adding sulfur hexafluoride ($SF_6$) gas to a cooling system of a power generating system while the power generating system is online, the cooling system circulating hydrogen gas through the power generating system to cool the power generating system, the power generating system comprising a steam or gas turbine generator unit, the $SF_6$ gas being capable of absorbing light having one or more particular wavelengths;
    while adding the $SF_6$ gas to the cooling system, monitoring a purity of a gas inside the cooling system, a pressure inside the cooling system, and a pressure at a differential fan inside the cooling system to at least approximately maintain the purity of hydrogen gas inside the cooling system, the pressure inside the cooling system, and the pressure at the differential fan to original equipment manufacturer (OEM) specification on the power generating system;
    directing laser light comprising one of the particular wavelengths at a section of the power generating system; and
    viewing an image of the section of the power generating system generated from light directed at the section of the power generating system to determine whether $SF_6$ gas emanating from the section of the power generating system is absorbing laser light directed at the section of the power generating system, the $SF_6$ gas emanating from the section of the power generating system indicating a leak in the power generating system, a site emanating the $SF_6$ gas indicating a precise location of the leak, one or more dimensions of a visible cloud of the $SF_6$ gas emanating from the section of the power generating system indicating a size of the leak, a visible flow rate of a visible cloud of the $SF_6$ gas emanating from the section of the power generating system further indicating the size of the leak.

* * * * *